E. B. BROWN.
TIRE.
APPLICATION FILED JULY 3, 1916.

1,330,756.

Patented Feb. 10, 1920.
3 SHEETS—SHEET 1.

INVENTOR
Egbert B. Brown

E. B. BROWN.
TIR .
APPLICATION FILED JULY 3, 1916.
1,330,756.
Patented Feb. 10, 1920.
3 SHEETS—SHEET 2.
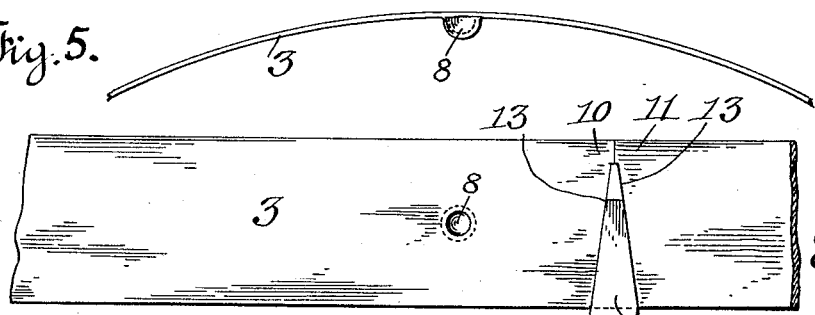
Fig. 5.
Fig. 6.
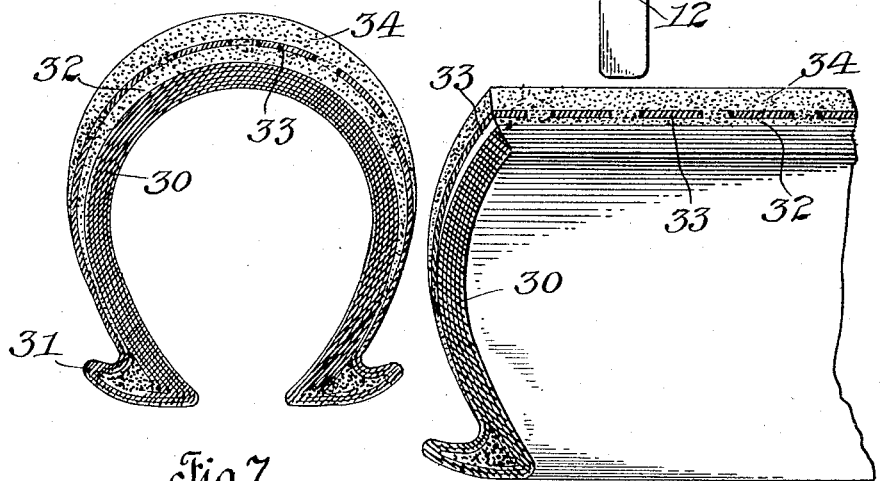
Fig. 7.
Fig. 8.
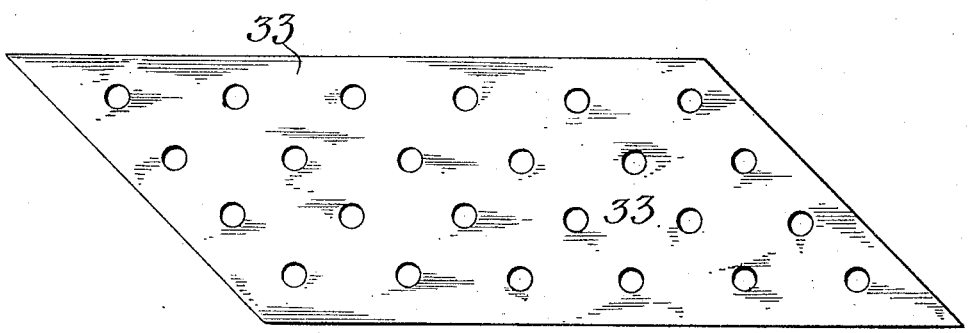
Fig. 9.
INVENTOR

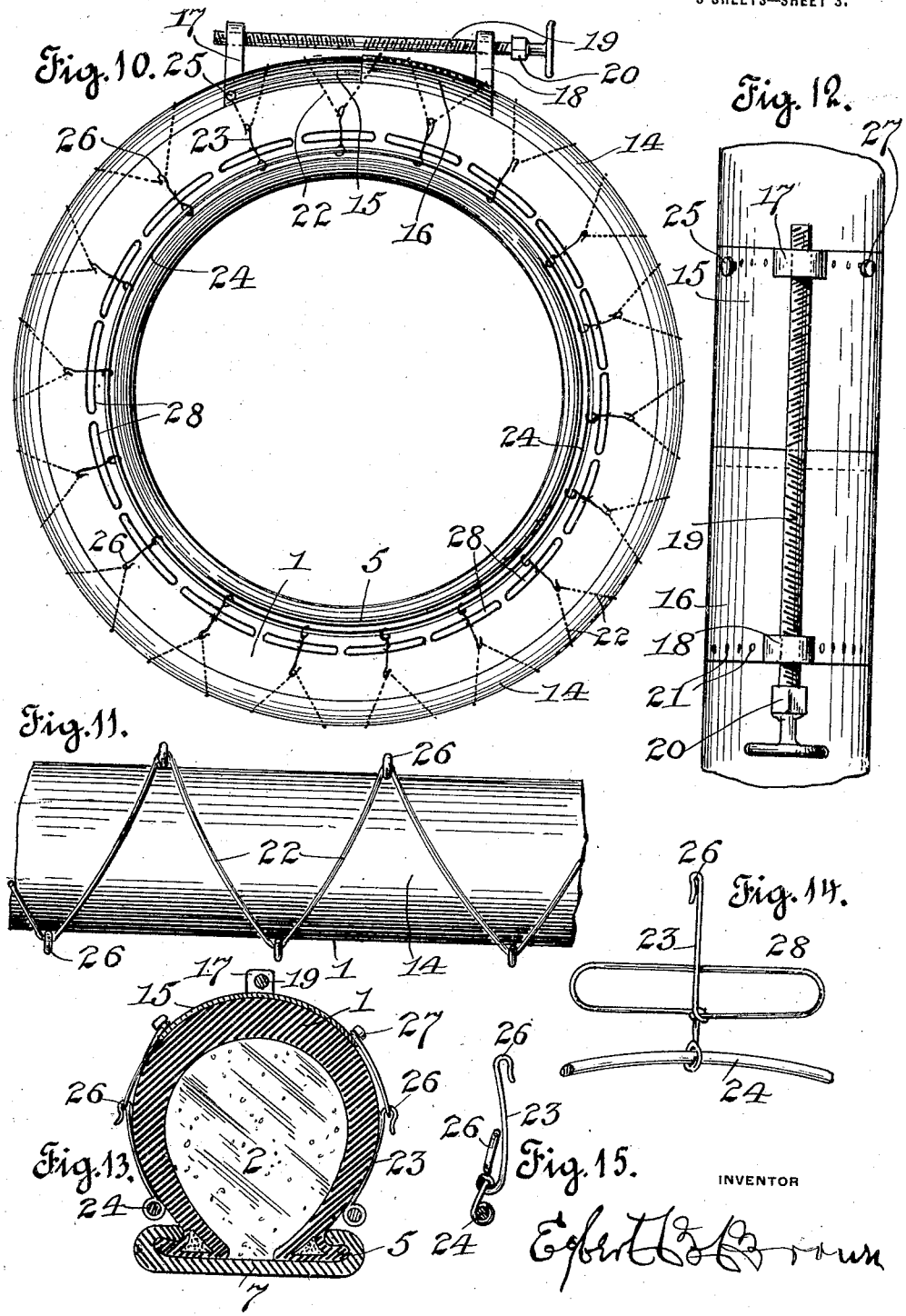

UNITED STATES PATENT OFFICE.

EGBERT B. BROWN, OF LOS ANGELES, CALIFORNIA.

TIRE.

1,330,756.  Specification of Letters Patent.  Patented Feb. 10, 1920.

Application filed July 3, 1916. Serial No. 107,321.

*To all whom it may concern:*

Be it known that I, EGBERT B. BROWN, a citizen of the United States, residing at Los Angeles, in the county of Los Angeles and State of California, have invented certain new and useful Improvements in Tires, of which the following is a specification.

This invention relates to improvements in tire structures and has particular reference to noncollapsible tires made up of a tire casing or outer holding member, and a core or mechanical casing expanding member together with an expanding rim or ring for holding the mechanical expanding member in place. The structure is such that a device similar to the ordinary pneumatic tire, with its demountable rim, is secured.

The invention comprises a tire casing or outer holding member, a tire expanding member, of a mechanical type which must be compressed to force it into place within the casing, whereby a resilient tire is secured, means also being provided for keeping the said core in position.

The invention also comprises a casing having a resilient compressed core member, and provided with an inner expanding ring adapted to force and keep the said core member in place, and a casing contracting means for facilitating the placing of the casing upon the rim of a wheel.

The invention also comprises a tire adapted to take the place of a pneumatic tire and having a casing of superior construction, and an oversize expansible core member or mechanically expanding member, and means for facilitating the placing of the tire upon a rim and permitting the same to expand into position thereon, said means comprising an outer supporting band and an inner tire contracting harness adapted to engage the walls of the tire, whereby the inner periphery thereof is contracted and reduced in diameter temporarily to permit the tire to be put in place or taken off.

With these and other objects in view, the invention comprises certain novel constructions, combinations and arrangements of parts as will be hereinafter more fully described and claimed.

In the accompanying drawings forming a part of this specification:—

Fig. 5 is a fragmentary detail view showing the side elevation of the retainer ring and the lug formed thereon.

Fig. 6 is a detail plan view of the same.

Fig. 7 is a transverse sectional view through a modified form of tire casing showing the preferable construction of the same.

Fig. 8 is a detail sectional view of one half of the said modified form of casing, further showing its longitudinal construction.

Fig. 9 is a fragmentary detail view showing a portion of the interlocking sheathing employed in said casing.

Fig. 10 is a side elevation of my improved tire casing, showing the outer flexible clamping band mounted thereon and the side adjusting harness employed in connection therewith.

Fig. 11 is a top plan view of a portion of the casing tread showing the harness thereon.

Fig. 12 is a plan view of a portion of the clamping band and showing the adjusting means for holding the same in place.

Fig. 13 is a transverse sectional view through a casing and a clencher rim and showing the clamping means with the tire contracting harness connected therewith.

Fig. 14 is a fragmentary detail view showing one of the harness hooks or hangers together with one of the side hoops or rings.

Fig. 15 is a fragmentary detail view showing one of the hangers or hooks.

The tire structure of the present invention is designed to afford a mechanism in which the advantages of a pneumatic tire may be secured, without the usual disadvantages had therewith, wherein the puncturing of the tube, or the blowing out of the tube and casing are liable to occur and where inflation must be continually renewed. The tire of the present invention therefore embraces a mechanically expanding member adapted to expand without inflation and which must be inserted and compressed within the inner cavity of the casing and held therein. After such an expanding core member is crowded into a casing having a smaller inner area than will normally be filled by said core member, it would be evident that the compression upon such member may be made greater or less as desired and according to the weight which it will be necessary for the tire to sustain. If the core is to support a heavy weight, the expanding core member is made of sufficient size to require a large degree of compression to crowd it into the said casing. If, however, the weight of the vehicle and the loads it must carry are much lighter, the mechanical expanding core member will not need so much compression. The compression of the said core member will where it is made of proper compressible material, give the desired resiliency to the tire just as in the case of the inflation of a deflated tube, which is afterward inflated to the desired extent for the proper support of the load which is to be imposed thereon. The compression of the inner core member is facilitated by the employment of a retainer ring which is adapted to be expanded to push the said core member into place.

In setting forth this invention the part which has been represented as the core member or mechanically expanding tube, has merely been illustrated in a conventional manner for showing any kind of contractible material which can be contracted and forced into a smaller space, thus exerting a constant pressure to expand and resiliently hold the tire casing to the desired extended or distended position.

Figure 1:
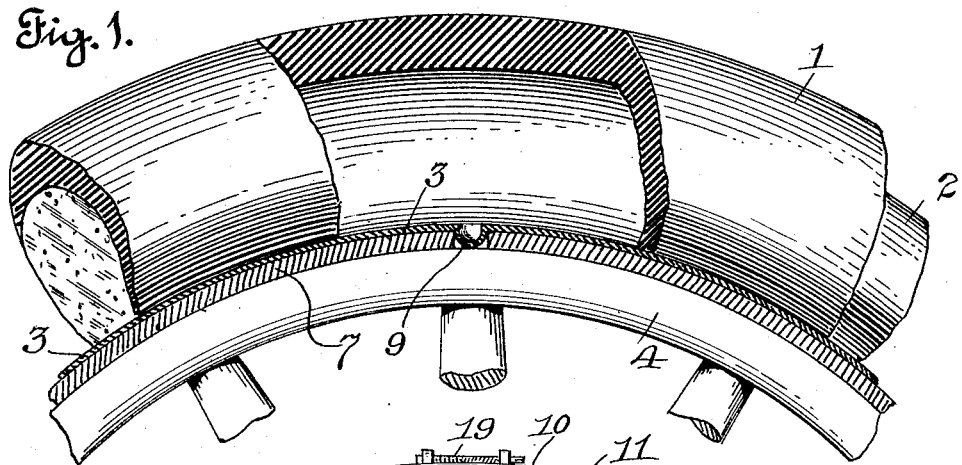
Figure 1 is a view partially in side elevation and partially in section showing the improved tire device attached to a portion of a rim of a wheel, parts being broken away to better show the construction.
Figure 2:
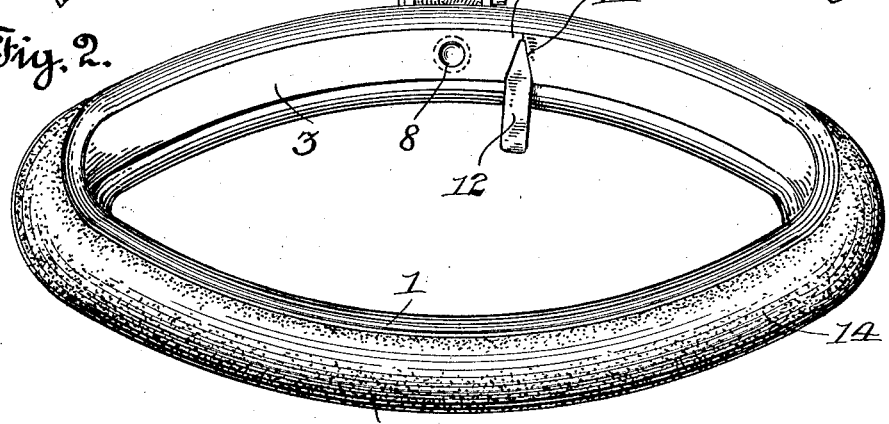
Fig. 2 is a perspective view of a tire expanded and ready for use, and showing the expansion and retaining band in place and the outer flexible clamping band in position for adjusting the tire to the rim of a wheel.
Figure 3:
Fig. 3 is a detail cross sectional view of the casing and the non collapsible core being inserted therein.

The details and features of the invention will now be more specifically set forth, reference being had to the accompanying drawings in which 1 indicates a casing, 2 a core or casing expanding member, 3 a retainer ring, and 4 the felly of a wheel. While the casing 1 may be of any preferred construction, it is preferably formed as illustrated in Figs. 7 and 8, which however, will be hereinafter more fully referred to. The said casing of whatever formation is provided with the usual clencher ribs or beads 5 for mounting the casing upon a wheel. The wheel felly is generally constructed with an iron or steel rim 7 fastened thereon. The casing 1 is intended to be expanded under pressure by placing an expansible core member 2 within the same. The core member is of a mechanically expanding type being made of a material which can be compressed and crowded into the casing cavity with a greater or less compression in accordance with the size of the said core. As illustrated in Fig. 3 of the drawing when such a large compressible core or core member is thrust into the casing it must be forced into the position so as to contract the same and to facilitate this operation the retainer ring 3 is employed. The ring 3 is preferably made of flat metal bent to a ring form and of a width suitable to permit it to enter the space between the clencher edges of the wheel rim. The said ring 3 is provided with a boss or projection 8 usually forced out upon the ring upon the inner face thereof, which is adapted to drop into an aperture as 9 in the rim 7 of the wheel. The said boss may be caused to engage the ordinary inflation tube opening provided in automobiles. The retainer ring 3 is made of such a size that its end portions 10 and 11 may be brought opposite each other when the said retainer ring has been expanded so as to force the core member into the casing. The said ring 3 is first contracted, its ends being lapped upon each other so that it can be readily put in place inside the expanding core member. The said ring 3 is then spread outwardly by any suitable mechanism, not shown, until its ends will snap or come opposite each other for holding the ring 3 in its distended position. The said retainer ring 3 may also be further expanded to a slight degree for facilitating the slipping of the same on to the vehicle rim 7 by the insertion of a suitable tool as 12 between the ends of the said ring 3. To facilitate the insertion of such a tool the meeting ends of the ring are tapered as at 13 to form a wedged shaped opening to receive the tapered point of the said tool. The tool is of flat metal of substantially the same thickness as the thickness of the ring 3 so that it will slip upon the vehicle rim 7 holding the ring slightly expanded as just described until in place, when the tool 12 may be removed permitting the contraction of the tire to firmly hold the said ring 3 upon the rim 7. The boss 8 can thus be caused to enter the aperture 9 when the ring is so expanded, and when contracted again, the said boss will prevent any movement of the said ring longitudinally upon the rim of the wheel.

To further facilitate the putting of the tire of the present invention in position, a casing controlling mechanism is employed and before endeavoring to force the expansible core member in position a flexible band 14 is placed around the outer tread surface of the casing. The said band may be of any desired fabric or similar material of proper strength and carries at its ends curved metallic pieces 15 and 16 which are adapted to lap at their meeting edges and telescope one upon the other. Standards 17 and 18 extend outwardly upon the said metallic pieces 15 and 16 and are provided with screw threaded apertures adapted to be engaged by a screw 19 having its opposite ends oppositely threaded. By applying a socket key or handle 20 to the squared end of said screw 19, the same may be turned for drawing the plates 15 and 16 together or separating them again. The ends of the fabric 14 are secured as by rivets 21, or in any other desired manner, to the said plates 15 and 16, whereby the band or fabric 14 can be tightened about the tire. This compression is preferably placed upon the casing before the putting of the retainer ring 3 in place tending to spread the clencher edges slightly.

Figure 4:
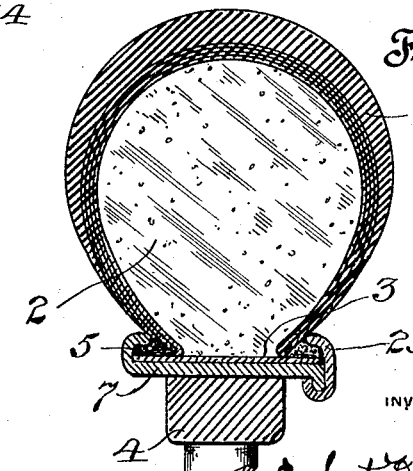
Fig. 4 is a detail cross sectional view through the noncollapsible core after insertion within the casing, the same being applied to the rim of the wheel.

In order to compress the inner periphery of the casing and force the clencher edges of the tire toward each other so that the tire may be more readily inserted within the clencher edges of a rim, a hanger mechanism is employed in conjunction with the band 14, made up of a cord or cable 22 and a series of hooks or hangers 23 which support a hoop or ring 24, mounted on each side of the casing. The cable 22 is secured to a stud or set screw 25 on one end of the plate 15. The said cable is then threaded back and forth in the hooks 26 of the hangers, the said cable or cord being passed through a hook upon one side of the casing and then through a hook upon the other side, returning the cord or cable again to the first side of the tire and so on back and forth until all of the hooks and hangers are caught and drawn outwardly by the lacing of the said cord or cable. The end of the cable last fastened is again secured to a stud or set screw 27 upon the opposite side of the tire from the set screw 25. By lacing the cable while the hangers are comparatively loose and drawing the cable up snugly when securing it to the last stud, the harness may be drawn up tightly by turning the screw 19. The rings or hoops 24 can not stretch, being made of metal and by pulling them toward the peripheral tread of the tire, they will be caused to force the edge walls of the tire inwardly, compressing the core member within and thus bringing the clencher beads or edges into folded position whereby the casing can be more readily placed upon the rim of the wheel. The hangers or hook members 23 are also preferably provided with casing engaging loops 28, formed of wire or other suitable material, and extended on either side of the hangers a distance to nearly reach to the adjacent ends of the next loops. In this manner the clencher edges of the casing are more evenly pressed inwardly when using the harness. After forcing the edges of the casing inwardly as just described, the whole device may be slipped upon the rim of the wheel and by gradually releasing the lacing 22 the clencher edges or beads will be allowed to gradually expand beneath the clencher edges of the rim, until the expansion of the inner core member holds the casing tightly in place. The harness and the band 14 together with the plates 15 and 16 may then be removed. These implements may be folded up into small space and carried about in the auto or other vehicle so that it will be ready for use at any time that the casing needs removal and replacing. The mechanism is just as suitable for removing a worn out casing, as for placing a new one in position as will be readily understood, the operation above set forth being merely reversed. Where a small clencher tire with integral clencher edges upon the rim, is employed, the expanding and retaining ring 3 need not be mounted upon the wheel rim and after forcing the core member into the casing and securing the same by means of the exterior harness, the retaining ring may be removed if desired. When using large casings, and when the casings are to be mounted upon rims of the quick-detachable type or the straight sided type, the retainer ring 3 is preferably placed upon the wheel rim with the casing and core or expanding member as clearly shown in Fig. 4. In such instances of course one flange, as for instance 29, is removed from the wheel rim and the tire casing with its contents and the retainer ring holding the same in place, is slipped sidewise upon the wheel rim as 7 and the clencher or straight side flange 29 of the rim is then put in place again.

Although the device can be used in connection with casings such as indicated at 1 in Figs. 1, 3, 4 and 13 of the drawing, the best result is obtained by forming the said casing as illustrated in Figs. 7, 8 and 9 of the drawing. The casing is provided with the usual number of tire fabric layers 30 which are molded over the forming core in the usual way. The outer one of these layers is usually shaped to form the clencher ribs 31 of the casing. The outer surface of the fabric 30 is then covered with unvulcanized rubber gum 32 shaped to be thicker at the tread of the casing and to taper therefrom to a thinner layer at the sides. A perforated interlocking sheathing 33 of tire fabric is then placed over the inner layer of rubber gum and pressed upon the same so as to be embedded in the gum. If desired the edges of the fabric 33 may be carried around the clencher ribs for anchoring the sheathing at the edges of the tire. After the sheathing has been firmly pressed into contact with the inner layer of gum 32, the outer tread portion of the tire is built up with a suitable thickness of unvulcanized rubber gum as at 34. This is carried to the proper thickness at the tread of the casing and tapers toward the sides of the casing and extending toward the clencher ribs. This outer layer of gum is forced into contact with the sheathing 33 and through the perforations therein so as to reach and unite with the inner layer of gum 32. The whole tire casing is then vulcanized in the usual manner, whereby the rubber on the inner and outer sides of the interlocking sheathing becomes intermingled in a homogeneous mass with the said sheathing and the casing upon which the rubber gum is placed. It will be understood of course that the rubber extends through the perforations of the interlocking sheathing and becoming thoroughly incorporated in the structure of the casing, renders it practically impossible to strip the rubber from the interlocking sheathing. It will be evident of course that a casing of this type will be especially well adapted for the holding of a core member of a mechanically operated expanding member, which has to be crowded into the said casing. It will be evident also that the casing structure with the expanding core member is admirably adapted for use upon any kind of a wheel rim. While no particular structure of expanding core or core member has been set forth, it will be understood that such a member is formed of material capable of compression but with a strong tendency of regaining its position, whereby the resiliency of the casing is very great. Such an expanding core member is not susceptible to punctures or blow outs, and the only thing which may happen to the tire of a detrimental character is the final wearing out of the material of which the outer casing is composed which is as long, of course, as there is any tread portion left capable of holding the inner expansible core member in place. The life of such a tire is rather measured in years than in miles. The tire constructed in accordance with applicant's invention is thus superior, in that it is found to negotiate ruts and pebbles without transmitting undue vibration to the car or mechanism.

What is claimed is:—

In combination with a wheel rim having flanges around its opposite edges, an outer casing adapted at its opposite edges to fit into said flanges, a resilient core member in said outer casing, and a flat expanding ring member around said wheel rim and between said rim and the inner edges of said outer casing and the inner periphery of said core member, and interlocking means between said wheel rim and said expanding ring member, whereby to prevent relative movement therebetween.

In testimony whereof I have hereunto set my hand in presence of two witnesses.

EGBERT B. BROWN.

Witnesses:
CASSELL SEVERANCE,
ROSEBUD CARNES.